(12) United States Patent
Kwon

(10) Patent No.: US 11,939,649 B2
(45) Date of Patent: Mar. 26, 2024

(54) METALLIC SINTERING COMPOSITIONS INCLUDING BORON ADDITIVES AND RELATED METHODS

(71) Applicant: BOARD OF TRUSTEES OF MICHIGAN STATE UNIVERSITY, East Lansing, MI (US)

(72) Inventor: Patrick Kwon, Okemos, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 0 days.

(21) Appl. No.: 17/849,110

(22) Filed: Jun. 24, 2022

(65) Prior Publication Data

US 2022/0324219 A1 Oct. 13, 2022

Related U.S. Application Data

(63) Continuation of application No. 15/616,267, filed on Jun. 7, 2017, now Pat. No. 11,370,214.
(Continued)

(51) Int. Cl.
| | |
|---|---|
| *C22C 38/00* | (2006.01) |
| *B22F 1/05* | (2022.01) |
| *B22F 1/18* | (2022.01) |
| *B22F 10/12* | (2021.01) |
| *B22F 10/28* | (2021.01) |

(Continued)

(52) U.S. Cl.
CPC ........... *C22C 38/00* (2013.01); *B22F 1/18* (2022.01); *B22F 10/12* (2021.01); *B22F 10/34* (2021.01); *B22F 10/50* (2021.01); *B22F 12/55* (2021.01); *B33Y 10/00* (2014.12); *B33Y 70/00* (2014.12); *B33Y 70/10* (2020.01); *B22F 1/05* (2022.01); *B22F 10/28* (2021.01); *B22F 10/38* (2021.01); *B22F 12/41* (2021.01); *B22F 12/63* (2021.01);
(Continued)

(58) Field of Classification Search
CPC ......... B33Y 10/00; B33Y 70/00; B33Y 70/10; B22F 10/50
See application file for complete search history.

(56) References Cited

U.S. PATENT DOCUMENTS

| | | | | |
|---|---|---|---|---|
| 4,927,461 | A * | 5/1990 | Ciloglu | ................. B22F 3/1003 419/57 |
| 5,932,055 | A | 8/1999 | Newell et al. | |

(Continued)

OTHER PUBLICATIONS

Do et al. ("Improving structural integrity with boron-based additives for 3D printed 420 stainless steel." Procedia Manufacturing 1 (2015): 263-272) (Year: 2015).*
(Continued)

*Primary Examiner* — Ricardo D Morales
(74) *Attorney, Agent, or Firm* — MARSHALL, GERSTEIN & BORUN LLP

(57) ABSTRACT

The disclosure relates to sintering compositions that can be used in three-dimensional printing or additive manufacturing processes. The sintering compositions generally include one or more metallic iron-containing powders and a minor amount of a boron-containing powder as a sintering aid. Sintered models or products formed from the sintering compositions have substantially improved density and surface roughness values relative to models formed without the boron-containing powder.

26 Claims, 5 Drawing Sheets

Related U.S. Application Data

(60) Provisional application No. 62/346,695, filed on Jun. 7, 2016.

(51) Int. Cl.

| | | |
|---|---|---|
| *B22F 10/34* | (2021.01) | |
| *B22F 10/38* | (2021.01) | |
| *B22F 10/50* | (2021.01) | |
| *B22F 12/41* | (2021.01) | |
| *B22F 12/55* | (2021.01) | |
| *B22F 12/63* | (2021.01) | |
| *B33Y 10/00* | (2015.01) | |
| *B33Y 70/00* | (2020.01) | |
| *B33Y 70/10* | (2020.01) | |

(52) U.S. Cl.
CPC ....... *B22F 2998/10* (2013.01); *B22F 2999/00* (2013.01)

(56) References Cited

U.S. PATENT DOCUMENTS

| | | | |
|---|---|---|---|
| 11,370,214 | B2 | 6/2022 | Kwon et al. |
| 2002/0176793 | A1 | 11/2002 | Moussa et al. |
| 2004/0009089 | A1* | 1/2004 | Liu .................. B33Y 70/00 419/38 |
| 2004/0182202 | A1 | 9/2004 | Geving et al. |
| 2017/0297109 | A1* | 10/2017 | Gibson ................ B22F 3/1021 |

OTHER PUBLICATIONS

Verlee et al. ("Density and porosity control of sintered 316L stainless steel parts produced by additive manufacturing." Powder Metallurgy 55.4 (2012): 260-267.) (Year: 2012).*
Allen et al., "Three-Dimensional Printing of Metal Parts for Tooling and Other Applications," *Met. Mater.*, 6:589-94 (2000).
Bagliuk, "Properties and structure of sintered boron containing carbon steels", Sintering—Methods and Products, InTech China, Chapter 12, pp. 249-266 (Year: 2012).
Conner et al., "Making Sense of 3-D Printing: Creating a Map of Additive Manufacturing Products and Services," *Addit. Manuf.*, 1-4:64-76 (2014).
Do et al., "Improving Structural Integrity with Boron-Based Additives for 3D Printed 420 Stainless Steel," 43rd Proceedings of the North American Manufacturing Research Institution of SME (Jun. 8-12, 2015) *Procedia Manuf.*, 1:263-72 (2015).
Do et al., "Process Development Toward Full-Density Stainless Steel Parts with Binder Jetting Printing," *Int. J. Mach. Tools Manuf.*, 121:50-60 (2017).
Farid et al., "Microstructure and Property Evolution During the Sintering of Stainless Steel Alloy with $Si_3N_4$," *Mater. Sci. Eng., A.*, 472:324-331 (2008).
German et al., "Enhanced Sintering Treatments for Ferrous Powders," *Int. Met. Rev.*, 29(4):249-72 (1984).
Kakisawa et al., "Dense P/M Component Produced by Solid Freeform Fabrication (SFF)," *Mater. Trans.*, 46(12):2574-81 (2005).
Lanzetta et al., "Improved Surface Finish in 3D Printing Using Bimodal Powder Distribution," *Rapid Prototyping J.*, 9(3):157-66 (2003).
Lorenz et al., "Densification of a Powder-Metal Skeleton by Transient Liquid-Phase Infiltration," *Metall. Mater. Trans. A*, 35A:631-40 (2004).
Moon et al., "Slurry Chemistry Control to Produce Easily Redispersible Ceramic Powder Compacts," *J. Am. Ceram. Soc.*, 83(10):2401-08 (2000).
Sercombe, "Sintering of freeformed maraging steel with boron additions." Materials Science and Engineering, A363(2003): 242-252 (Year: 2003).
Sun et al., "Densification and Properties of 420 Stainless Steel Produced by Three-Dimensional Printing with Addition of $Si^3N^4$ Powder," *J. Manuf. Sci. Eng.*, 131:061001-1-7 (2009).
Warren et al., "Microstructural Development During the Liquid-Phase Sintering of Cemented Carbides," *Powder Metall.*, 15(30):166-201 (1972).
Zhu et al., "Pressureless sintering of zirconium diboride using boron carbide and carbon additions", Journal of the American Ceramic Society, 90(11):3660-3663 (Year: 2007).

* cited by examiner (A)

(B)

(C)

(A) (B) (C)

(A) (B) (C)

METALLIC SINTERING COMPOSITIONS INCLUDING BORON ADDITIVES AND RELATED METHODS

CROSS-REFERENCE TO RELATED APPLICATIONS

This application is a continuation of U.S. patent application Ser. No. 15/616,267 filed Jun. 7, 2017, which claims the benefit of U.S. Provisional Application No. 62/346,695 filed Jun. 7, 2016, which are incorporated herein by reference in their entireties.

STATEMENT OF GOVERNMENT INTEREST

None.

BACKGROUND OF THE DISCLOSURE

Current three-dimensional printing techniques utilizing sintering of a binder-fixed sintering model typically achieve a final density of about 50%-60% of the theoretical density of an iron-based sintered powder. The resulting sintered product is then infiltrated with a bronze alloy through capillary action to increase the product density. The infiltrated and sintered product, however, does not have uniform composition and can be unsatisfactory in terms of material properties for much application (e.g., mechanical or tensile properties, electrical properties, thermal properties, etc.).

SUMMARY

In an aspect, the disclosure relates to a sintering composition comprising (e.g., consisting essentially of or consisting of) in admixture: (a) a first metallic iron-containing powder; (b) a boron-containing powder; and (c) (optionally) a second metallic iron-containing powder having at least one of a different composition relative to the first metallic iron-containing powder and a different size distribution relative to the first metallic iron-containing powder (e.g., a number-, mass-, or volume-average size or diameter that is different between the first and second powders). In a refinement, the second metallic iron-containing powder is present; and the first metallic iron-containing powder and the second metallic iron-containing powder are present in a weight ratio in a range from 1:10 to 10:1 (e.g., 1:9 to 9:1, 1:8 to 8:1, 1:6 to 6:1, 1:4 to 4:1, 1:3 to 3:1, 1:2 to 2:1, or 1:1.5 to 1.5:1). In another refinement, the second metallic iron-containing powder is present; and the first metallic iron-containing powder and the second metallic iron-containing powder have a different size distribution from each other. For example, the first metallic iron-containing powder and the second metallic iron-containing powder can have the same composition and together form a bimodal size distribution of the same composition.

Various refinements of the sintering composition are possible.

In a refinement, the first metallic iron-containing powder and the second metallic iron-containing powder (when present) independently comprise iron-containing metallic alloy particles (e.g., same or different kind of alloy particles for the first and second powders; such as containing at least 50, 60, 70, 80, 90, or 95 wt. % iron and optionally one or more of carbon, manganese, aluminum, chromium, copper, nickel, molybdenum, silicon, vanadium). For example, the first metallic iron-containing powder and the second metallic iron-containing powder (when present) can independently comprise stainless steel particles (e.g., same or different kind of stainless steel particles for the first and second powders). Similarly, the first metallic iron-containing powder and the second metallic iron-containing powder (when present) can independently comprise steel particles (e.g., same or different kind of steel particles for the first and second powders). In another refinement, the boron-containing powder comprises one or more of elemental boron particles, boron carbide (BC) particles, and boron nitride (BN) particles.

In a refinement, the first metallic iron-containing powder and the second metallic iron-containing powder (when present) are together present in an amount from 90 wt. % to 99.99 wt. % relative to the sintering composition (e.g., at least 90, 95, 98, 99, 99.9 wt. % and/or up to 95, 98, 99, 99.9 or 100 wt. % concentration in the sintering composition). In another refinement, the boron-containing powder is present in an amount from 0.01 wt. % to 10 wt. % relative to the sintering composition (e.g., at least 0.01, 0.1, 0.2, 0.5, or 0.8 wt. % and/or up to 1, 1.2, 1.5, 2, 5, 8, or 10 wt. % concentration in the sintering composition, such as 0.2 wt. % to 2 wt. %). In another refinement, the first metallic iron-containing powder, the boron-containing powder, and the second metallic iron-containing powder (when present) are together present in an amount from 90 wt. % to 100 wt. % relative to the sintering composition (e.g., at least 90, 95, 98, 99, 99.9, 100 wt. % and/or up to 95, 98, 99, 99.9 or 100 wt. % concentration in the sintering composition).

In a refinement, the first metallic iron-containing powder and the second metallic iron-containing powder (when present) independently have a particle size in a range from 1 µm to 100 µm (e.g., a number-, mass-, or volume-average size or diameter, such as at least 1, 2, 5, 10, or 20 µm and/or up to 10, 20, 40, 50, 80, or 100 µm; same or different size parameter for the first and second powders). For example, the first metallic iron-containing powder can have a particle size in a range from 10 µm to 50 µm (e.g., 20 µm to 40 µm); and the second metallic iron-containing powder can be present and have a particle size in a range from 1 µm to 20 µm (e.g., 2 µm to 10 µm). Alternatively or additionally, the second metallic iron-containing powder can be present; and the first metallic iron-containing powder and the second metallic iron-containing powder can have average sizes (number-, mass-, or volume-average sizes) in a ratio in a range from 1.5:1 to 10:1 (e.g., at least 1.5:1, 2:1, or 3:1 and/or up to 3:1, 5:1, 8:1, or 10:1 with the first powder having the larger average size). In another refinement, the boron-containing powder has a particle size in a range from 0.01 µm to 20 µm (e.g., a number-, mass-, or volume-average size or diameter, such as at least 0.01, 0.1, 0.2, 0.5, or 1 µm and/or up to 1, 2, 3, 5, 10, or 20 µm, for example 0.1 µm to 3 µm or 0.2 µm to 2 µm). In another refinement, the first metallic iron-containing powder and the boron-containing powder have average sizes (number-, mass-, or volume-average sizes) in a ratio in a range from 5:1 to 100:1 (e.g., at least 5:1, 10:1, 15:1, or 20:1, or 30:1 and/or up to 30:1, 50:1, 80:1, or 100:1 with the first powder having the larger average size).

In another aspect, the disclosure relates to a sintering model comprising: the sintering composition according to any of the variously disclosed embodiments; and a (cured) binder phase distributed throughout the sintering composition (e.g., a composite structure with the binder phase being distributed between adjacent powder particles in the sintering composition). In a refinement, the binder phase comprises a polymeric binder (e.g., a cureable or cured polymeric binder or resin, for example a crosslinkable or crosslinked binder or resin; cured binder or resin is degradable at an intermediate temperature between its curing temperature and the sintering temperature; an example binder system includes ethylene glycol monobutyl ether, ethylene glycol, and isopropanol).

In another aspect, the disclosure relates to a method for forming a fused or sintered model, the method comprising: sintering the sintering model according to any of the variously disclosed embodiments to form a unitary fused model from the sintering composition. Sintering generally includes applying heat and/or pressure a level and time sufficient to fuse the powder components of the sintering composition without substantial melting such as to liquefaction. Sintering can be performed under a vacuum or under an inert gas atmosphere (e.g., argon atmosphere) in order to avoid oxidation of the composition components during sintering. Sintering is suitably performed at a temperature sufficient to decompose/eliminate the binder from the model. In some embodiments, a pre-sintering step is performed after the binder is cured. The pre-sintering is performed at a temperature sufficient to decompose/eliminate the cured binder from the model, but less than a temperature sufficient to fully sinter the model (e.g., at least 200° C., 300° C., or 400° C. and/or less than 600° C., 800° C., or 1000° C.). At such decomposition temperatures, partial sintering of some power particles occurs to a degree sufficient to maintain the shape of the sintering model even in the absence the cured binder (albeit at a low density and with low tensile strength properties), which partially sintered model can be fully sintered at higher temperatures.

In another aspect, the disclosure relates to a method for forming a fused or sintered model, the method comprising: (a) providing a sample of the sintering composition according to any of the variously disclosed embodiments (e.g., sample can be any shape or size, such as a thin layer of sintering composition powder); (b) applying a binder to at least a portion of the sintering composition sample; (c) optionally repeating (a) and (b) a plurality of times, wherein (i) successive sintering composition samples are provided and applied to the previous sintering composition sample, (ii) successive sintering composition samples can be the same or different size and/or shape, and (iii) successive portions of applied binder can be the same or different size and/or shape; (d) curing the binder and then removing free sintering composition from bound sintering composition to form a sintering model (e.g., removal of free, flowable sintering composition powder not fixed by the cured binder in the bound sintering composition); and (e) sintering the sintering model to form a unitary fused model from the sintering composition. In a refinement, the sintering composition sample is in the form of a thin layer (e.g., at least 0.01, 0.02, 0.05, or 0.1 mm and/or up to 0.1, 0.2, 0.5, 1, 2, or 5 mm, such as 0.02 mm to 1 mm; successive samples in a multi-sample process can have same or different layer thicknesses). In another refinement, curing the binder comprises performing one or more of applying heat to the binder, exposing the binder to light (e.g., ultraviolet light of a UV-cureable binder resin), exposing the binder to oxygen and/or water (e.g., expose to air, such as for moisture- or oxidation-cureable resins). In another refinement, the method comprises performing (c) as part of a three-dimensional printing process (e.g., applying successive sintering composition samples as success layers in an adjustable print bed and applying successive portions of binder with a moveable print head).

In another aspect, the disclosure relates to a method for forming a fused or sintered model, the method comprising: (a) providing a sample of the sintering composition according to any of the variously disclosed embodiments (e.g., sample can be any shape or size, such as a thin layer of sintering composition powder); (b) locally sintering at least a portion of the sintering composition sample (e.g., using a localized or point-wise source of heat or energy, such as a laser, electron beam, etc.); (c) optionally repeating (a) and (b) a plurality of times, wherein (i) successive sintering composition samples are provided and applied to the previous sintering composition sample, (ii) successive sintering composition samples can be the same or different size and/or shape, and (iii) successive portions of locally sintered composition can be the same or different size and/or shape; and (d) removing free sintering composition from locally sintered composition to form a fused model.

In a refinement, the sintering composition sample is in the form of a thin layer (e.g., at least 0.01, 0.02, 0.05, or 0.1 mm and/or up to 0.1, 0.2, 0.5, 1, 2, or 5 mm, such as 0.02 mm to 1 mm; successive samples in a multi-sample process can have same or different layer thicknesses). In another refinement, the method comprises performing (c) as part of a three-dimensional printing process (e.g., applying successive sintering composition samples as success layers in an adjustable print bed and locally sintering successive portions of composition with an adjustable localized or point-wise source of heat or energy head).

Various refinements of the sintering and fusing methods as well as the resulting fused model are possible.

In a refinement, sintering comprises heating to a temperature in a range from 1100° C. to 1300° C. (e.g., 1150° C. to 1250° C.). In another refinement, the fused model has a surface roughness less than that of a corresponding fused model formed without the boron-containing powder (e.g., at least a 10, 20, or 30% reduction and/or up to a 20, 40, 60, or 80% reduction in surface roughness). In another refinement, the fused model has a surface roughness in a range from 1 μm to 9 μm (e.g., at least 1, 2, 3, or 5 μm and/or up to 6, 7, 8, or 9 μm). In another refinement, the fused model has a density that is greater than that of a corresponding fused model formed without the boron-containing powder (e.g., at least a 10, 20, or 30% increase and/or up to a 20, 30, or 40% increase in density). In another refinement, the fused model has a density of at least 80% relative to the theoretical density of the sintering composition (e.g., at least 80, 85, 90, 95, or 98% and/or up to 90, 95, 98, 99, or 100% of the theoretical density of the sintering composition/metallic powder components thereof, where theoretical density is the density of a continuous, non-porous sample of the sintering composition/metallic powder components).

In another aspect, the disclosure relates to a unitary fused model having any of the foregoing characteristics, for example formed according to any of the variously disclosed methods and using any of the variously disclosed sintering compositions and/or models.

While the disclosed compounds, methods and compositions are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

BRIEF DESCRIPTION OF THE DRAWINGS

For a more complete understanding of the disclosure, reference should be made to the following detailed description and accompanying drawings wherein.

DETAILED DESCRIPTION

Figure 1:
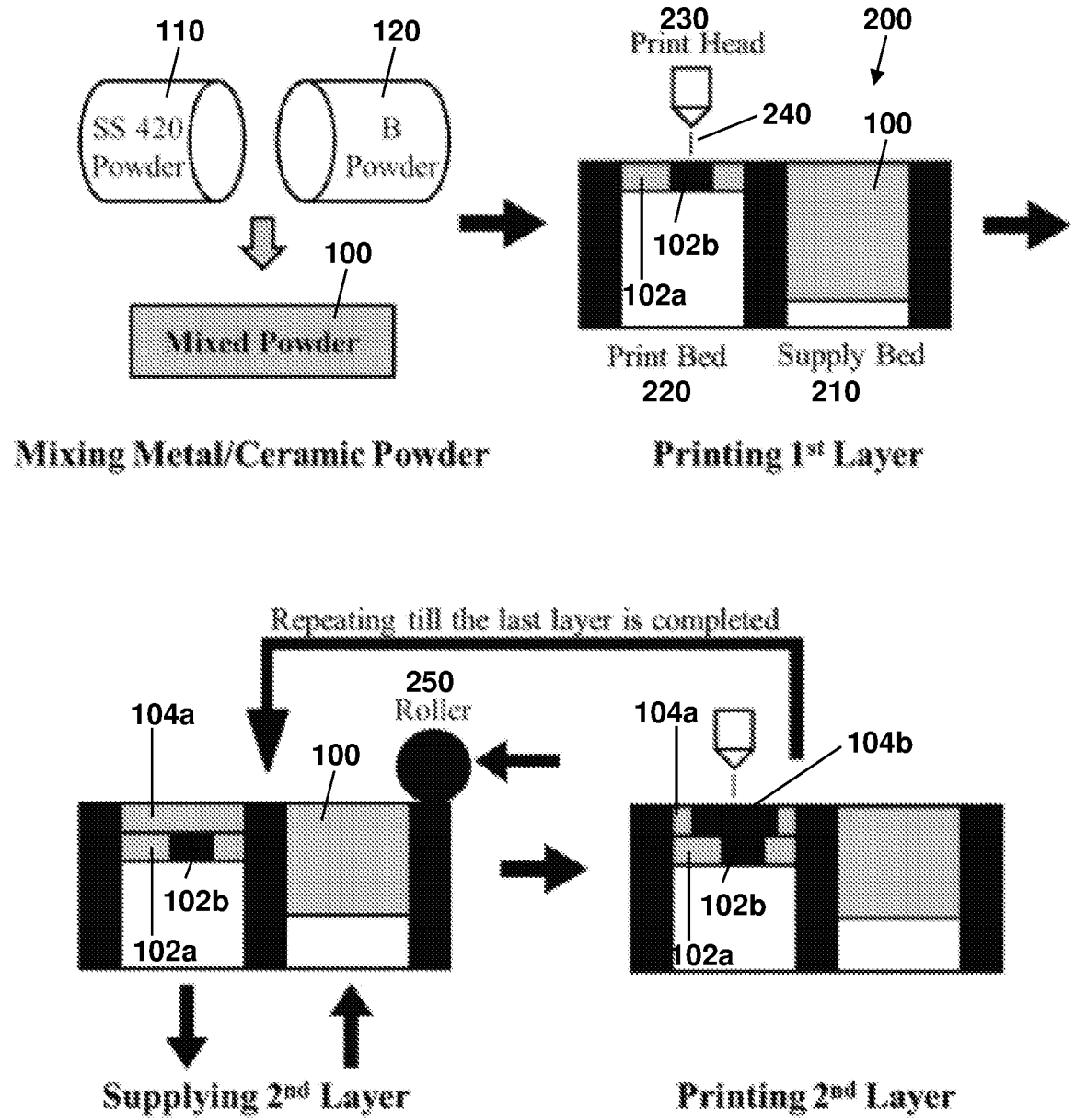
FIG. 1 is a schematic illustrating a three-dimensional printing or additive manufacturing process according to the disclosure.

The disclosure relates to sintering compositions that can be used in three-dimensional printing or additive manufacturing processes. The sintering compositions generally include one or more metallic iron-containing powders and a minor amount of a boron-containing powder as a sintering aid. Sintered models or products formed from the sintering compositions have substantially improved density and surface roughness values relative to models formed without the boron-containing powder.

In current additive manufacturing (AM) processes, it is difficult to obtain a combination of high structural integrity, complexity, and desirable scales in the formed part/product from the AM process. Scale means both volume (size) and quantity of the formed part, while the complexity relates to both the geometric complexity as well as the customization of the formed part. A part requiring high structural integrity is not easy to produce using AM at the present time. A simple solution to increase in the scale is to increase the working environment or to operate many machines in parallel. However, the integrity requires the AM fabrication to make a product with the material whose strength is comparable to the material produced in traditional manufacturing processes. This is the major challenge within the AM community.

Many types of powder-based AM systems are currently available. Such systems include three-dimensional (3D) printing (3DP), selective laser sintering (SLS), selective laser melting (SLM) and electron beam melting (EBM). These powder-based systems can be distinguished based on two consolidation methods: local and uniform heating. Immediately, the local heating methods such as SLS, SLM and EBM are the main source of inhomogeneity in AM parts. These methods may typically achieve a much higher final density (although not reaching a theoretical density completely) because the material is melted and consolidated with a heating source such as laser or electron beam. Then, during the printing process, the consolidated material below is altered while the material above is consolidating. Therefore, the microstructure is extremely non-uniform and sometimes the residual stresses can be too intense to form cracks in the processed material. This problem can be mitigated by raising the temperature during printing or heat-treating and/or hot-isostatic pressing (HI P-ing) afterwards to minimize these detrimental defects as well as voids. 3DP is one of the few methods where a part can undergo uniform heating, resulting in a more uniform final microstructure. However, the primary drawback of 3DP is its typical inability to achieve a high relative density, which in turn can adversely affect the final material properties of the formed part.

In most processes, the relative density of metallic green parts obtained by 3DP can reach about the 50-60% of a theoretical density. This result is much lower than the green compacts made via powder metallurgy (P/M), which enables up to the 85% of a theoretical density. In general, the density of a part made from 3DP is much lower than that made form P/M technique. Thus, a post-processing step is necessary to improve the final density of a 3D printed part using current methods. After 3D printing, a part is typically infiltrated with a low melting metallic material such as bronze, which changes the nature of the material while slightly improving the mechanical properties such as elastic modulus, yield strength, hardness etc. by filling in the pores of the printed material. A few other techniques for making high-dense homogeneous 3DP parts have been published. One of them was the method of infiltrating transient liquid phase that combines through diffusion with the skeletal material to form a desirable final composition. The disadvantage of this infiltration method is that in increases the cost of the entire process. A fine carbonyl nickel powder (size 5 mm) has been used to print parts, and then sinter the parts in order to reach 92% relative density.

The static properties such as hardness, yield strength and elastic modulus of an AM part must reach those of a traditionally processed part if they are expected to use in real applications. Moreover, an AM part is noticeably lacking in its fatigue properties. Instead of the costly measurement of the physical properties of the materials after AM, the density of the sintered product samples can be evaluated to represent overall physical properties of the final product. As illustrated in the examples below, stainless steel 420 (SS420) powder was mixed with various compounds as possible sintering aids to improving the final density, which is the first step toward improving the integrity of 3DP parts. This approach can allow fabrication of functional parts, also known as direct digital manufacturing using the powder-based system. One of few machines available in the current market that provide a uniform consolidation condition is 3DP units manufactured by EXONE (N. Huntingdon, PA). This system contains two powder beds: supply and print. The part building process for this device is based on depositing layer by layer of powder while injecting a binder phase at the data points from the given STL file. The required STL file can be created from the simple conversion of a CAD part file.

Previous work demonstrated the effectiveness of ceramic sintering aids for enhancing sintered samples printed from 420 stainless steel. Silicon nitride powder was mixed with stainless steel powder, which resulted in a high relative density (~98%) and excellent mechanical properties (near 200 GPa) sintering at 1300° C. with slight distortion on the 3D printed part. However, because of the large amount of silicon nitride (12.5 wt % equivalent to 28% volume), the part may not have been considered to be a stainless steel.

In order to reduce the amount of additive utilized, boron-based powders including boron (B), boron nitride (BN) and boron carbide (BC) were evaluated and compared. According to the phase diagram of iron-boron, 1174° C. is the liquid-phase formation at eutectic temperature. Its low melting temperature is advantageous because sintering could be performed at a relatively low temperature. In P/M experiments, only 0.4 wt % of boron was added to 316 stainless steel and sintered at 1240° C., which resulted in 99% density. As illustrated in the examples below, the densification test for many samples at different locations in the powder bed was conducted to test the homogeneity of printed parts. To improve the surface finish, small particle sizes for the additives were selected to fill in the gaps of the larger particles (e.g., stainless steel base powder particles) in order to increase surface quality and smoothness of the final part.

FIG. 1 illustrates the formation and use of a sintering composition 100 according to the disclosure to form a corresponding sintering model and/or sintered or fused model (e.g., a unitary fused model). The sintering composition 100 includes a first metallic iron-containing powder 110 and a boron-containing powder 120 in admixture, which powders can be suitably blended in a (dry) mixer. Other desired components of the sintering composition 100, such as a second metallic iron-containing powder (not shown) or otherwise, can be mixed with the metallic iron-containing powder 110 and the boron-containing powder 120. A suitable apparatus for forming a sintering model is illustrated in FIG. 1 as a three-dimensional printing apparatus 200 including a supply bed 210, a print bed 220, a print head 230 adapted to deliver a binder 240 (e.g., with the print head 230 containing the binder 240 or being in fluid connection with a binder 240 reservoir (not shown)), and a roller 250. A supply of the sintering composition 100 is placed in the supply bed 210, and a first sample 102a of the sintering composition 100 is delivered via the roller 250 to the print bed 220 as a thin layer of the sintering composition 100. Binder 240 is then selectively applied via the print head 230 to a portion 102b of the sintering composition 100 first sample 102a. The print bed 220 is then lowered (e.g., via a moveable lower supporting surface therein), and a second sample 104a of the sintering composition 100 is delivered via the roller 250 to the print bed 220 as a thin layer of the sintering composition 100 sitting on top of the previous first sample 102a and binder-containing portion 102b thereof. Similarly, further binder 240 is then selectively applied via the print head 230 to a portion 104b of the sintering composition 100 second sample 104a. The process of adding additional layers/samples of the sintering composition 100 with corresponding binder-containing portions can be repeated as desired to build a corresponding sintering model 300 in which the collective binder-containing portions of the sintering composition 100 generally define the geometry of the sintering model 300 and eventual sintered or fused model. Preferably, the binder 240 in the sintering model 300 is cured (e.g., via exposure to heat, light, oxygen, water, etc.) and excess free sintering composition 100 is then removed (e.g., as a free-flowing powder). The sintering model 300 (e.g., with a cured binder 240 and without excess sintering composition 100 powder) can then be placed in a suitable furnace (not shown), where the sintering model 300 can be sintered as a whole at a selected temperature. In other embodiments (not illustrated in FIG. 1), a binder-less method of sintering can be used in which a sample of the sintering composition 100 is locally sintered at selected portions (e.g., using a localized or point-wise source of heat or energy, such as a laser, electron beam, etc.), which portions are selected to correspond to the desired geometry of the final fused or sintered model.

Examples

The following examples illustrate the disclosed sintering compositions, sintering models, and related three-dimensional printing or additive manufacturing methods, but are not intended to limit the scope of any claims thereto.

The examples illustrate the ability of the disclosed compositions and methods to attain fully dense parts with a powder-based 3D printing method by sintering, instead of following the standard protocol of infiltrating bronze. Example ingredients that can be added to improve the densification were tested, which will also enhance the structural integrity of 3D printed 420 stainless steels (SS). As already applied in the field of powder metallurgy (P/M), a small addition of ingredients (sintering aid) into a base metal powder enhances densification and improves the final structural integrity. Numerous P/M works have suggested possible ingredients as sintering aids, but did not perform tests with a consistent set of experimental conditions. These examples use a consistent set of experimental conditions, including the use of 420 stainless steel (SS) as a base powder, which is common for 3D printing, with an average size of 30 micron. The base powder was sintered between 1150 and 1250° C. after the powder was mixed with various sintering ingredients, including various boron-containing powders. Each sintered sample was analyzed in terms of the final density attained, the amount of ingredient mixed, and the sintering temperature.

Materials: Spherical stainless steel 420 SS powder (available from EXONE, N. Huntingdon, PA) was used in all experiments as the base powder. 420 SS has a particle size distribution range between 22 μm and 53 μm and with a mean size of 30 μm. Three additives, boron (B), boron carbide (BC) and boron nitride (BN), were used as sintering aids, and their material specifications were provided in Table 1.

TABLE 1

Additives Material Specification

| Material | Provider | Average Particle Size (μm) | Density (g/cm$^3$) |
|---|---|---|---|
| B | Sigma Aldrich | 1 | 2.34 |
| BC | Panadyne | 0.6 | 2.51 |
| BN | Sigma Aldrich | 1 | 2.29 |

For each sintering aid, three experiments were conducted with 0.5 wt %, 1.0 wt % and 1.5 wt % of additive with the balance being 420 SS as the base powder, with one additional comparison sample batch that contained no additives (i.e., 100 wt. % 420 SS). During each experiment (printing batch), 400 grams of powder mixture was measured and mixed. All powders were measured using ADVENTURER AR 2140 (Ohaus Corp., Parsippany, NJ, USA) which has a resolution of 0.0001 g. A speed mixer DAC 150 (FlackTek, Inc., Landrum, SC, USA) was then used to mix the powder mixture with angular velocity of 2000 rpm and 90 seconds per cycle for three cycles. For the density and densification rate experiments, 9 cubic samples were printed, each with dimensions of 8 mm by 8 mm by 8 mm.

Sample Preparation: The printing process for the tested samples used an X1-LAB 3D printer (available from EXONE, N. Huntingdon, PA). As generally shown in FIG. 1, this machine operates through the use of two beds: a supply bed and a print bed. Prior to the printing process, the supply bed is lowered as far as it can and filled with the prescribed power mixture. This ensures that the machine can print as many layers as a design requires. The print bed, however, is raised to the top, so the layers of powder can easily be moved onto it. Once the printing process has begun, a roller moves a layer of power (0.1 mm) from the supply bed and layers a layer to the print bed. The machine then lays down a binder phase on top of the layer. Once the next layer is ready to be laid down, the supply bed is raised, so the appropriate amount of powder is exposed, and the print bed is lowered, so the new layer can easily be moved on to it. This process is repeated until the part is completed. In the printing process, the amount of binder phase on each layer has to be controlled such that the layer can bind to the previous layer to form a final shape of a part.

Density Variation: The deposition variation within the print bed was the first concern. This could result in size variation depending on the location of a part printed in the powder bed. To investigate this possibility, nine small cubes were printed and the shrinkage on each cube was measured in a real time while sintering using a thermomechanical analyzer (TMA) (EVOLUTION 18, available from Setsys, France) under the protective environment of argon gas. The final sintering temperature was set at 1400° C. for 6 hours with a temperature rate of 10° C./min for both heating and cooling cycles, and the final cooling temperature was set at a room temperature.

Sintering: A Materials Research Furnaces (MRF; Allenstown, NH) environment-controlled furnace was used to sinter the 3D printed samples. The furnace utilized argon gas to avoid oxidation. By extracting the gas in the furnace before the sintering begins, the oxidation of the samples was prevented. For the experimental process, the 3D printed samples were separated depending on the sintering temperature. The three sintering temperatures were 1150° C., 1200° C., and 1250° C. In order to reach the sintering temperatures, the samples were placed in the furnace, and the heating process was started at room temperature. The furnace then began to heat samples to 240° C. at a rate of 10° C./min. Once the furnace reached 240° C., it was kept at this temperature for 2 hour to burn out the binder phase. The binder phase consists of ethylene glycol monobutyl ether, ethylene glycol and isopropanol which are expected to burn out at the temperatures of 170° C., 197.3° C. and 82.6° C., respectively. Thus, at 240° C., these binder phase is completely eliminated. Then, the furnace was heated to each prescribed sintering temperature from 240° C. at a rate of 5° C./min. Once the samples reached their prescribed sintering temperature, they were kept at this temperature for 6 hours to complete the sintering process of the samples. The samples were then cooled back down to room temperature at a rate of 10° C./min. In order to calculate the relative density, the volume of each fully sintered piece was measured by Archimedes' principle using an ADVENTURER AR 2140 scale (Ohaus Corp., USA), which has a resolution of 0.0001 g.

Results—Density Variation: Each 3D-printed cube was labeled #1 to #9, based on its location in a 3×3 matrix to test spatial density within a generally horizontal plane. During printing, the overall layout was centered to the print bed and each part was spaced evenly; thus cube #5 was the origin, (0,0). All other cubes were either 1 unit away in horizontal direction or vertical direction or both (i.e., transverse and lateral directions in a plane perpendicular to the axial printing direction), and their coordinates were assigned accordingly (e.g., cube #1 was at position (−1, 1)). After the printing process, the printed samples are very close in the printed dimensions. In order to see the density variation among these samples, the samples were sintered at 1400° C. in the TMA.

Figure 2:
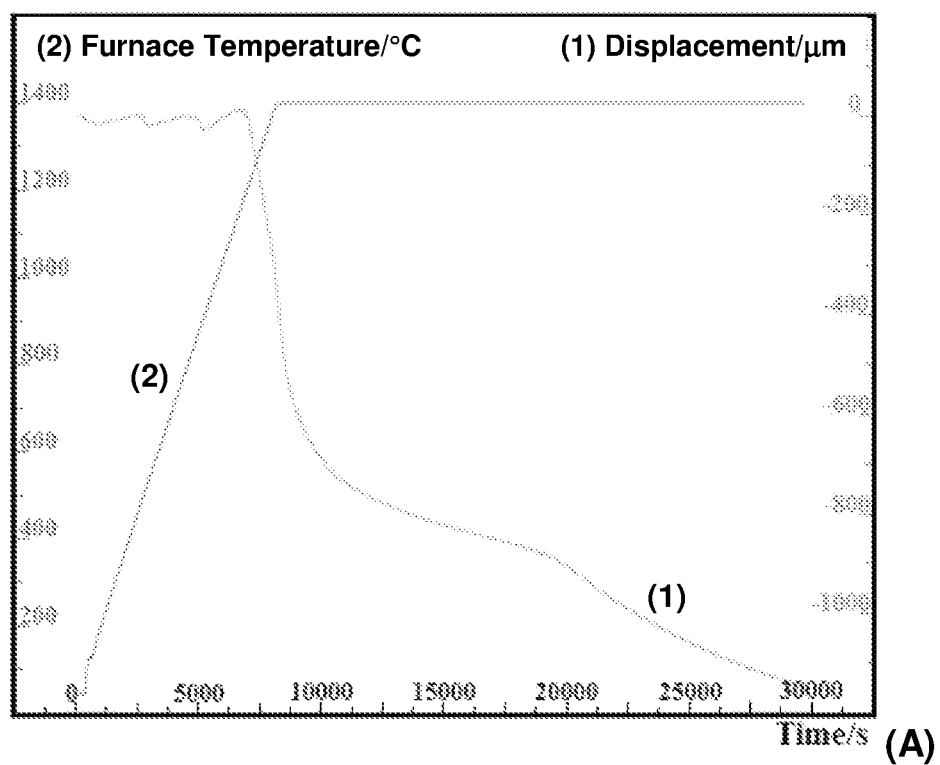
FIG. 2 includes graphs illustrating (1) densification/displacement (μm) and (2) furnace temperature profile (° C.) for a sintered cube formed according to the disclosure during (A) heating and holding in zone 1 and (B) cooling in zone 2.
Figure 2:
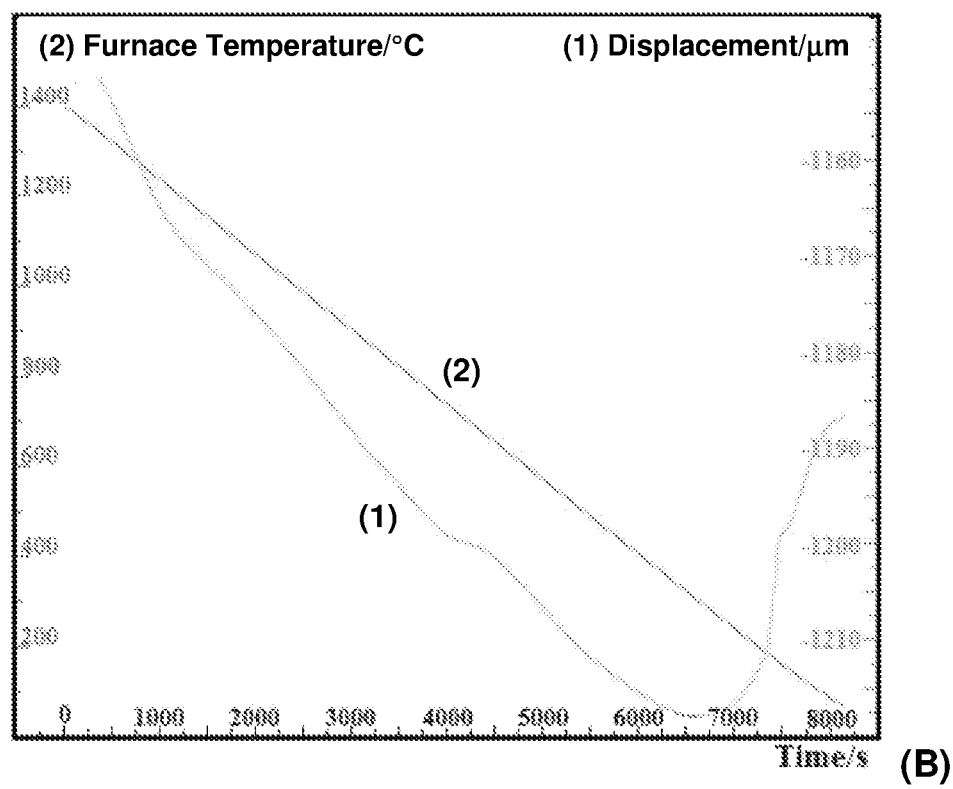

All samples had similar densification profiles as shown in FIG. 2. This is the densification of the cube 1. Each profile was separated into two zones: zone 1 (heating and holding) and zone 2 (cooling). FIG. 2 includes both temperature and densification profiles during the time span. The shrinkage starts at 1200° C. and the shrinkage rate increases much faster when the temperature reaches 1400° C. The samples continue to shrink in cooling process, so the density of the final sample may be increased by increasing the soaking time (6 hours).

A correlation matrix (ranging from −1 to 1) was computed and shown in Table 2 to analyze the relationship between the printed location of each cube and the correlation in shrinkage, both maximum shrinkage and shrinkage at 1400° C. Shrinkage was converted to positive value prior to the analysis. A significant negative correlation between the shrinkage and horizontal direction indicated that shrinkage increases as the location of cube moves to the left (negative direction); and near to zero correlation between the shrinkage and vertical direction implied that vertical location was not a significant factor for shrinkage. As the roller spread the power from the right side of power bed to the left side, the right side of the powder bed had a higher compact factor since more powder exists at the beginning (the right side) on each layer than at the end (the left side). Therefore, the parts printed on the left side of the powder bed would experience more shrinkage as observed during TMA experiment.

TABLE 2

Correlation Matrix of Shrinkage in Horizontal & Vertical Directions

|  | Correlation in Maximum Shrinkage | Correlation in Shrinkage at 1400° C. |
|---|---|---|
| Horizontal Direction | −0.8205 | −0.71688 |
| Vertical Direction | 0.052274 | 0.133584 |

Figure 3:
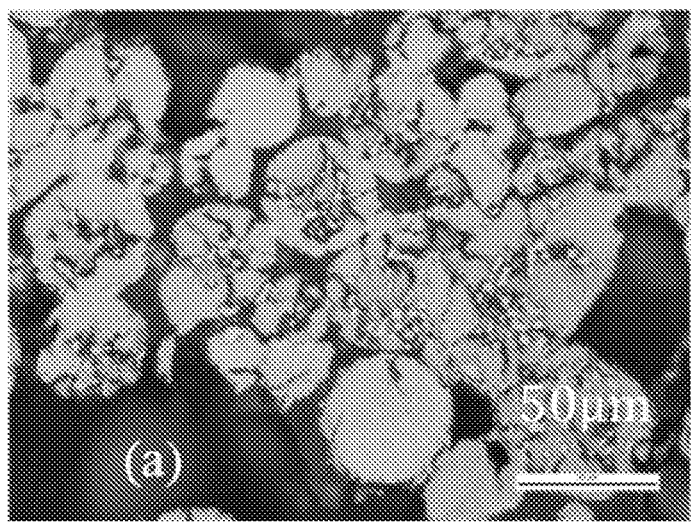
FIG. 3 includes optical microscope images illustrating the microstructure of sintered product samples formed according to the disclosure for samples including (A) 0.5% boron sintered at 1150° C. (scale bar: 50 μm), (B) 0.5% boron sintered at 1200° C. (scale bar: 50 μm), and (C) 0.5% boron sintered at 1250° C. (scale bar: 100 μm).
Figure 3:
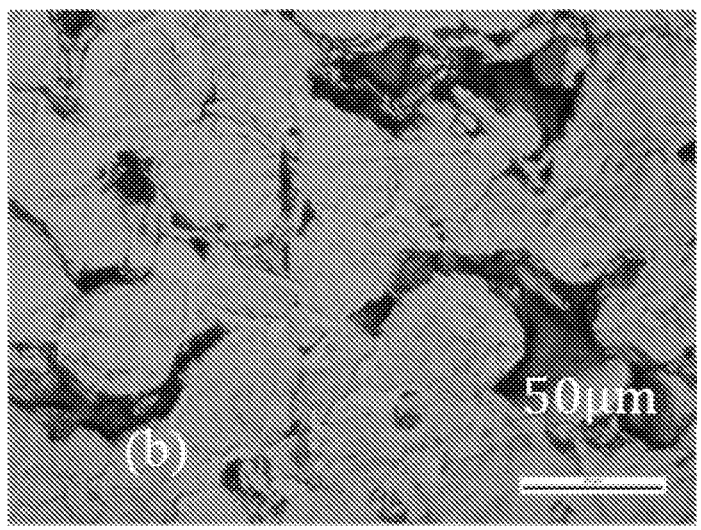
Figure 3:
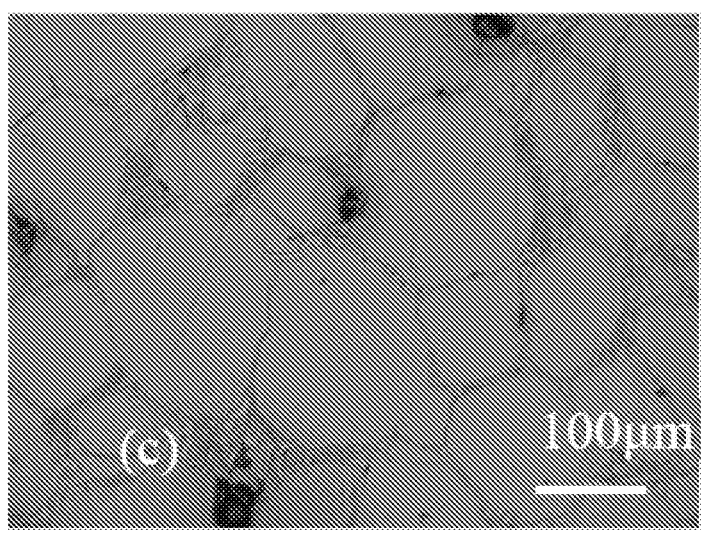

Results—Liquid Phase Sintering: Each sample was polished using a diamond polishing solution with a grit size of 1 µm for 30 minutes and etched with the solution made of 10 mL $HNO_3$, 20 mL HCl and 30 mL water for a few seconds. Then it was examined under optical microscope to visualize the microstructure. FIG. 3 (panels A, B, C) shows the microstructures of the samples with 0.5% of B additives sintered at (A) 1150° C., (B) 1200° C. and (C) 1250° C., respectively. FIG. 3(B) shows that the samples sintered at 1200° C. had liquid phase present as powders started to group themselves, as compared to FIG. 3(A) where the powders in their original spherical shapes remained the same. FIG. 3(C) shows the formation of much larger grains and grain boundaries. It indicates that the grains have coalesced into larger grains. FIG. 3(C) also shows necklace microstructure between grains, an indication of liquid phase sintering. Similar microstructure behavior can be observed in the samples with the other two additives sintered at higher temperature, where liquid phase sintering started to occur based on the presence of the necklace microstructure.

Results—Surface Quality: One of the important issues with 3D printing is the surface quality. Because of its characteristic building process, the layering is evident on the side surfaces of the printed part. It improves little after sintering. Using a powder with a bimodal size distribution, it is possible increase not only the density of the sample (because the multiple powder sizes can increase the packing density) but also the surface quality of the samples. However, sometimes the mixing two distinct powders is difficult. The slurry method is used with a bimodal powder because small particles are difficult to be spread when they are dry and the amount of fine powder is generally more than 25 wt. % (i.e., with 75 wt. % or less coarse powder relative to total powder) with previous approaches to using bimodal powders. However, these examples used only small amounts of fine additive powder (i.e., 0.5-1.5 wt. % boron-based additive with average sizes between 0.6-1 μm), and the high speed mixing process described above was very effective.

Figure 4:
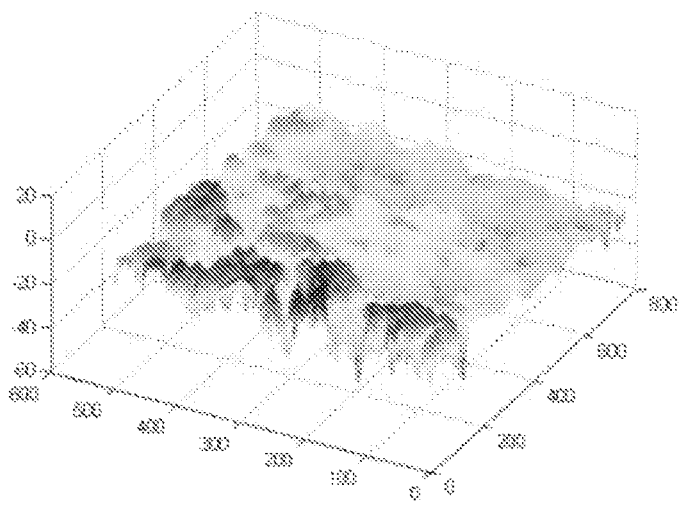
FIG. 4 includes confocal laser scanning microscope images illustrating the topography of sintered product samples formed according to the disclosure for samples sintered at 1250° C. and including (A) 0.5% boron carbide, (B) 0.5% boron nitride, and (C) no boron additive (i.e., pure stainless steel).
Figure 4:
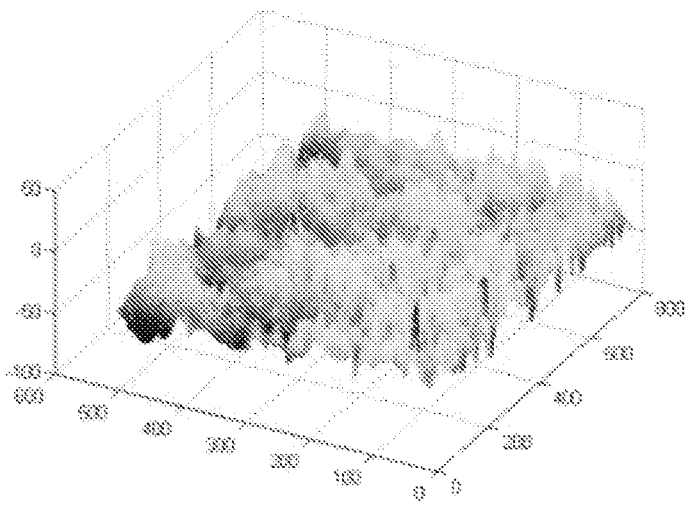
Figure 4:
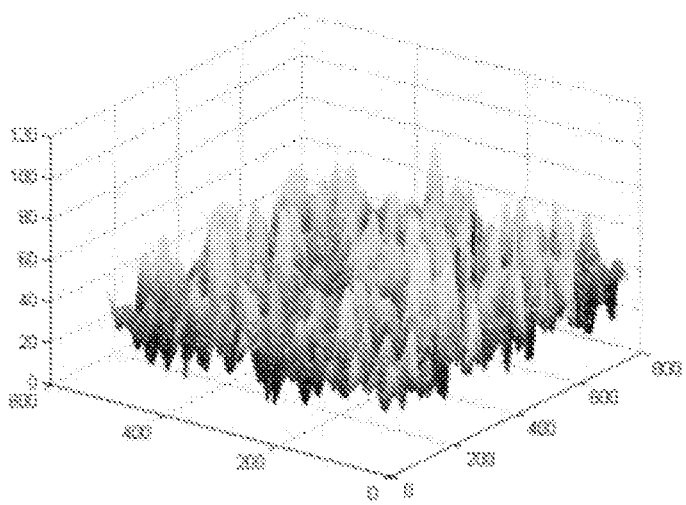

The surface roughness of each sample after sintering was measured by a Zeiss LSM 210 Confocal Laser Scanning Microscope. FIG. 4 shows the topography of three sintered samples at 1250° C. with (A) 0.5% boron carbide, (B) 0.5% boron nitride, and (C) pure stainless steel. The surface roughness decreases significantly in the samples with the additives. Especially, the sample with 0.5% boron carbide sintered at 1250° C. formed a liquid phase and provided a smooth surface. The average roughness value, Ra, improved from 9.01 μm with pure stainless steel to 8.2 μm with 0.5% boron nitride and 6.22 μm with 0.5% boron carbide.

Figure 5:
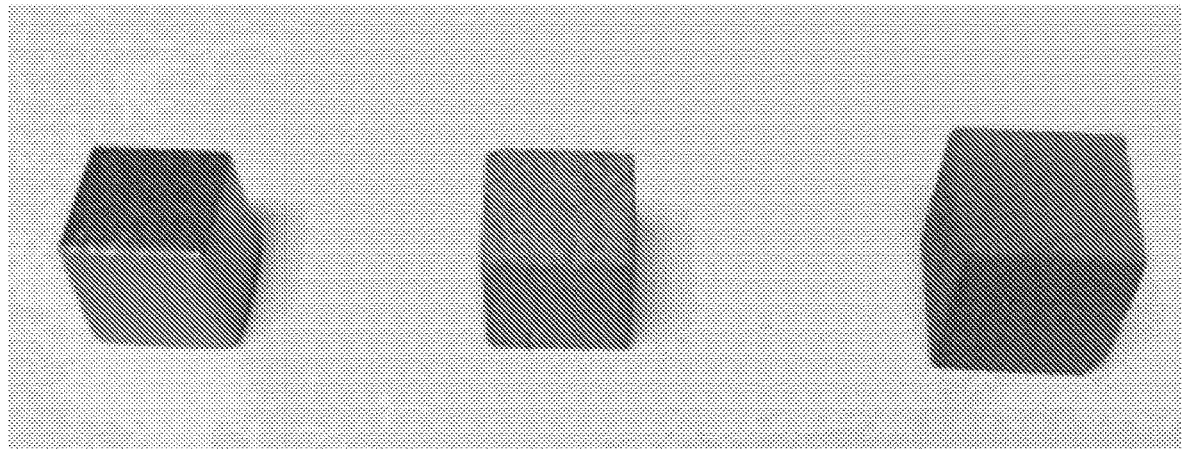
FIG. 5 includes images illustrating undistorted of sintered cubes formed according to the disclosure for samples sintered at 1250° C. and including (A) 0.5% boron carbide, (B) 0.5% boron nitride, and (C) no boron additive (i.e., pure stainless steel).
Figure 6:
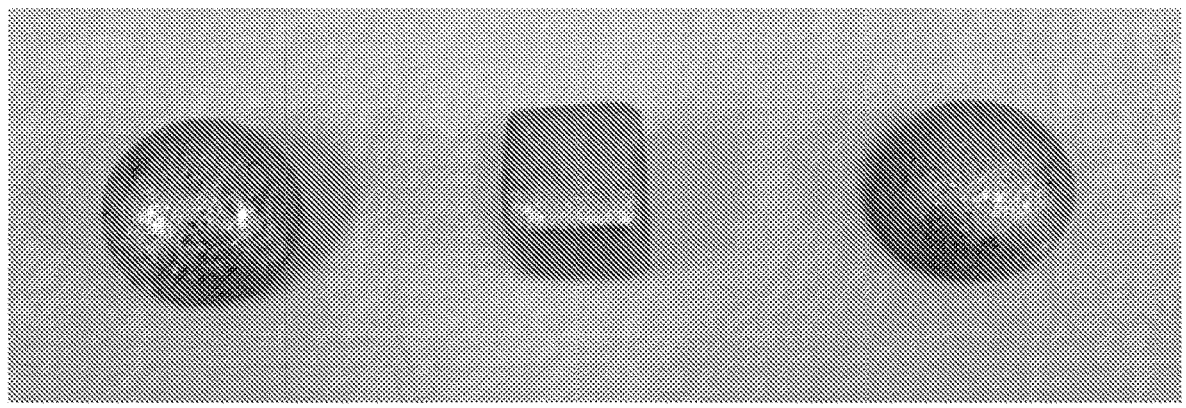
FIG. 6 includes images illustrating distorted of sintered cubes formed according to the disclosure for samples sintered at 1250° C. and including (A) 1.5% boron, (B) 1.5% boron nitride, and (C) 1.5% boron carbide.

Results—Densification: The SS420 powder samples were mixed with the 0.5%, 1% and 1.5% by weight of the three additives: boron (B), boron nitride (BN), and boron carbide (BC). Each of these samples was sintered at the temperatures of 1150° C., 1200° C. and 1250° C. The density of each sample after sintering was measured using the Archimedes principle. As shown in Table 3, the additives did not necessary increase the density of the samples after sintering at 1150° C. Raising the sintering temperature from 1150° C. to 1200° C. and 1250° C. increased the densities in each case. For each sintering temperature, it was found that the samples with 1% wt B additives had the highest densities. Among the samples with BN additives, the samples with 1% wt BN additive had the highest densities. The highest relative density was attained with the sample with 1% wt B additive at approximately 97%. There was a dramatic drop in the relative density from the 1% wt of B to the 1.5% wt of B at 1250° C. because the latter sample formed extensive liquid phase during sintering. With the presence of the extensive liquid phase, pores were generated. The liquid phase caused the distortion in the samples with 1.0% wt B and BC additives at both 1200° C. and 1250° C., and the sample with 1.0% wt BN additives at 1250° C. The samples with 1.5% wt of all additives sintered at 1250° C. exhibited shape distortion. The distortion was based on the observation of the shape of the cubic samples as illustrated in FIGS. 5 (no shape distortion) and 6 (moderate to extensive shape distortion). The sample with 0.5% wt of B additive sintered at 1250° was also distorted (not shown in figures). The sample with 0.5% wt of BN and BC sintered at 1250° C. remained the same shape as shown in FIG. 5 (panels A and B). The sample with the highest density that maintained its shape was the 0.5% BC sample sintered at 1250° C. with a relative density of 90.22%.

TABLE 3

Final Relative Densities After Sintering with and without Additives

| Relative Density Sintered at | Boron | | | Boron Nitride | | | Boron Carbide | | | No additive |
|---|---|---|---|---|---|---|---|---|---|---|
| | 0.5% | 1.0% | 1.5% | 0.5% | 1.0% | 1.5% | 0.5% | 1.0% | 1.5% | |
| 1150° C. | 52.95% | 55.33% | 54.56% | 51.80% | 53.58% | 49.74% | 53.35% | 53.33% | 50.24% | 55.32% |
| 1200° C. | 77.82% | 83.02% | 68.34% | 59.31% | 77.72% | 56.10% | 75.80% | 74.83% | 65.79% | 63.16% |
| 1250° C. | 90.70% | 96.98% | 80.57% | 87.62% | 91.41% | 90.18% | 90.22% | 93.97% | 83.46% | 64.58% |

Summary: The 3D printing and sintering process were used to make parts from SS420 stainless steel powder with boron-based additives. The effect of additive contents and sintering temperature were evaluated based on the relative densities of the final parts. (1) A slight variation in the densification rate of samples depended on the locations in the print bed. It can be explained by the variation in the powder packing as the roller moves from the right to the left. More powder is present at the right side of the print bed during the powder spreading. (2) The powder samples mixed with the smaller additives helped to improve the final surface finish substantially. Not only did the smaller additives fill into the interstitial spaces among large based powder particles, but also the additives enhanced diffusion among the stainless steels powder. (3) The highest density obtained was 97% with the sample containing 1% boron and sintered at 1250° C. However, the sample was extensively distorted because of the extensive formation of liquid phase. (4) The densest sample that maintained the original shape without distortion was the 0.5 wt. % boron carbide sintered at 1250° C. with the relative density of 90.22%. (5) The extensive distortion is evident with the boron (B only) additive. By reducing the sintering temperature, the use of the boron additive may improve the final shape.

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the compounds, compositions, methods, and processes are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifi-

REFERENCES

1. Allen, S M & Sachs, E M 2000, Three-Dimensional Printing of Metal Parts for Tooling and Other Applications,' Met. Mater. (Seoul, Rep. Korea), vol. 6, no. 6, pp. 589-594.
2. Budinski, K G & Budinski, M K 1999, Engineering Materials: Properties and Selection, 6th edn., Prentice-Hall, Englewood Cliffs, N J.
3. Conner, B P, Manogharan, G P, Martoff, A N, Rodomsky, L M, Rodomsky, C M, Jordan, D C & Limperos, J W 2014, 'Making Sense of 3-D Printing: Creating a map of Additive manufacturing Products and Services,' Additive Manufacturing, vol. 1-4, October, pp. 64-76
4. Farid, A, Feng, P, Du, X, Jawid, A., Tian, J & Guo, S 2008, 'Microstructure and Property Evolution During the Sintering of Stainless Steel Alloy With Si3N4,' J. Mater. Sci. Eng., vol. 472, pp. 324-331.
5. German, R M & D'Angelo, K A 1984, 'Enhanced Sintering treatments for Ferrous Powder,' International Metals Reviews, vol. 29, no. 1, pp. 249-272.
6. Kakisaw, H, Minagawa, K, Ida, K, Maekawa, K & Halada, K 2005, 'Dense O. M Component Produced by Solid Freefrom Fabrication (SFF),' Materials Transactions, vol. 46, no. 12, pp. 2574-2581.
7. Lanzetta, M & Sachs, E 2003, 'Improved surface finish in 3D printing using bimodal powder distribution,' Rapid Prototyping Journal, vol. 9, no. 3, pp. 157-166.
8. Lorenz, A, Sashs, E, Allen, S, Rafflenbeul, L & Kernan, B 2004, 'Densification of a Powder-Metal Skeleton by Transient Liquid-Phase Infiltration,' Metall. Mater. Trans. A, vol. 35A, pp. 631-640.
9. Molinari, A, Kazior, L, Marchetti, F, Canteri, R, Cristofolini I & Tiziani A 1994, 'Sintering mechanisms of boron alloyed AISI 316 stainless steel,' Powder Metallurgy, vol. 37, no. 2, pp. 115-112.
10. Moon, J, Grau, J E, Cima, MJ & Sachs, E M 2000, 'Slurry chemistry control to produce easily redispersible ceramic powder compacts,' Journal of the American Ceramic Society, vol. 83, no. 10, pp. 2401-3.
11. Riegger, H, Pask, JA & Exner, H E 1980, In: Kuczynski GC (ed) Sintering processes, Plenum Press, New York, pp 219-233.
12. Sun, L., Kim, YH, Kim, D & Kwon, P 2009, 'Densification and Properties of 420 Stainless Steel Produced by Three-Dimensional Printing with Addition of Si3N4 Powder,' Journal of Manufacturing Science and Engineering, vol. 131, no. 6, doi:10.1115/1.4000335.
13. Warren, R & Waldron, M B 1972, 'Microstructural development during the liquid phase sintering of cemented carbides,' Powder Metall, vol. 15, pp. 166-201.

What is claimed is:

1. A three-dimensional printing method for forming a fused model, the method comprising:
    applying a plurality of successive sintering composition layers, each layer comprising (i) a sintering composition powder layer and (ii) a binder applied to at least a portion of the sintering composition powder layer, wherein:
        the sintering composition powder comprises in admixture (a) a first metallic iron-containing powder, (b) a boron-containing powder, and (c) optionally a second metallic iron-containing powder having at least one of a different composition relative to the first metallic iron-containing powder and a different size distribution relative to the first metallic iron-containing powder;
        collective binder-containing portions of the sintering composition powder in the plurality of successive sintering composition layers define a selected geometry of the fused model; and
        applying the plurality of successive sintering composition layers comprises (i) applying successive sintering composition powder layers as successive layers in an adjustable print bed, and (ii) applying successive portions of binder with a moveable print head to the successive sintering composition powder layers;
    curing the binder and then removing free sintering composition from bound sintering composition to form a sintering model; and
    sintering the sintering model to form a unitary fused model from the sintering composition.

2. The method of claim 1, wherein each sintering composition powder layer has a thickness in a range of 0.01 mm to 5 mm.

3. The method of claim 1, wherein curing the binder comprises performing one or more of applying heat to the binder, exposing the binder to light, exposing the binder to oxygen and/or water.

4. The method of claim 1, wherein at least some of the successive portions of applied binder have a different size or a different shape relative to each other.

5. The method of claim 4, wherein at least some of the successive portions of applied binder correspond to less than the successive sintering composition powder layer to which they are applied.

6. The method of claim 1, wherein the first metallic iron-containing powder and the second metallic iron-containing powder (when present) independently comprise iron-containing metallic alloy particles.

7. The method of claim 1, wherein the first metallic iron-containing powder and the second metallic iron-containing powder (when present) independently comprise stainless steel particles.

8. The method of claim 1, wherein the first metallic iron-containing powder and the second metallic iron-containing powder (when present) independently comprise steel particles.

9. The method of claim 1, wherein the boron-containing powder comprises one or more of elemental boron particles, boron carbide (BC) particles, and boron nitride (BN) particles.

10. The method of claim 1, wherein the first metallic iron-containing powder and the second metallic iron-containing powder (when present) are together present in an amount from 90 wt. % to 99.99 wt. % relative to the sintering composition.

11. The method of claim 1, wherein the boron-containing powder is present in an amount from 0.01 wt. % to 10 wt. % relative to the sintering composition.

12. The method of claim 1, wherein the first metallic iron-containing powder, the boron-containing powder, and the second metallic iron-containing powder (when present) are together present in an amount from 90 wt. % to 100 wt. % relative to the sintering composition.

13. The method of claim 1, wherein:
the second metallic iron-containing powder is present; and
the first metallic iron-containing powder and the second metallic iron-containing powder are present in a weight ratio in a range from 1:10 to 10:1.

14. The method of claim 1, wherein:
the second metallic iron-containing powder is present; and
the first metallic iron-containing powder and the second metallic iron-containing powder have a different size distribution from each other.

15. The method of claim 14, wherein:
the first metallic iron-containing powder and the second metallic iron-containing powder have the same composition and together form a bimodal size distribution of the same composition.

16. The method of claim 1, wherein the first metallic iron-containing powder and the second metallic iron-containing powder (when present) independently have a particle size in a range from 1 μm to 100 μm.

17. The method of claim 16, wherein:
the first metallic iron-containing powder has a particle size in a range from 10 μm to 50 μm; and
the second metallic iron-containing powder is present and has a particle size in a range from 1 μm to 20 μm.

18. The method of claim 16, wherein:
the second metallic iron-containing powder is present; and
the first metallic iron-containing powder and the second metallic iron-containing powder have average sizes in a ratio in a range from 1.5:1 to 10:1.

19. The method of claim 1, wherein the boron-containing powder has a particle size in a range from 0.01 μm to 20 μm.

20. The method of claim 1, wherein the first metallic iron-containing powder and the boron-containing powder have average sizes in a ratio in a range from 5:1 to 100:1.

21. The method of claim 1, wherein the binder phase comprises a polymeric binder.

22. The method of claim 1, wherein sintering comprises heating to a temperature in a range from 1100° C. to 1300° C.

23. The method of claim 1, wherein the fused model has a surface roughness less than that of a corresponding fused model formed without the boron-containing powder.

24. The method of claim 1, wherein the fused model has a surface roughness in a range from 1 μm to 9 μm.

25. The method of claim 1, wherein the fused model has a density that is greater than that of a corresponding fused model formed without the boron-containing powder.

26. The method of claim 1, wherein the fused model has a density of at least 80% relative to the theoretical density of the sintering composition.

* * * * *